United States Patent Office 3,513,292
Patented May 19, 1970

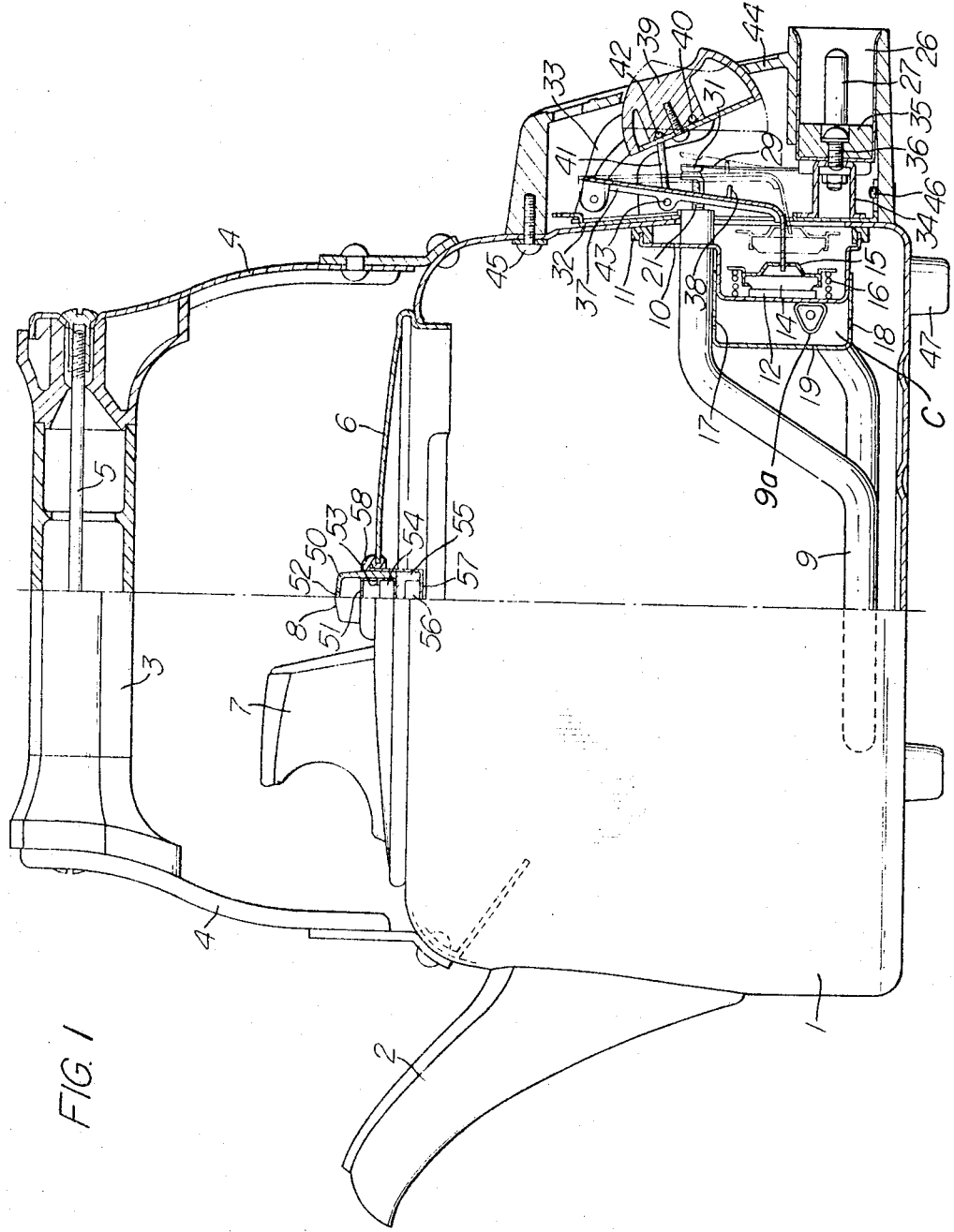

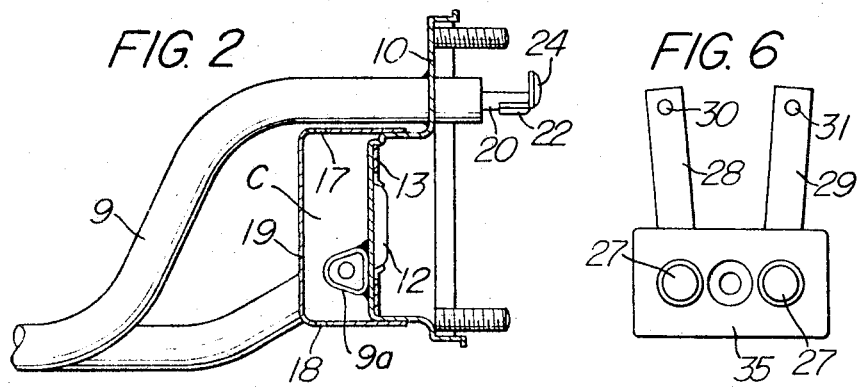

3,513,292
ELECTRIC KETTLE
Yoshiaki Sano, Kobe, and Yoshiaki Maeda, Nishinomiya-shi, Japan, assignors to Matsushita Electric Industrial Co., Ltd., Osaka, Japan, a corporation of Japan
Filed Apr. 25, 1966, Ser. No. 544,989
Claims priority, application Japan, Apr. 30, 1965, 40/26,055; May 8, 1965, 40/27,811
Int. Cl. F24h 1/00
U.S. Cl. 219—331                    7 Claims

ABSTRACT OF THE DISCLOSURE

In an electric kettle equipped with an electric heater and a switching means which stops the energization of the heater when the water boils, an improved switching means comprising a thermally actuated element attached on the kettle wall opposite to a portion of the heater, said portion of the heater being covered by an enclosure. The enclosure is provided with at least one small hole for allowing the steam vapor generated within said enclosure to emerge through the hole and thereby said thermally actuated element is acutely heated to cause a distinct actuating action.

---

The present invention relates to an electric kettle.

In an electric kettle, it is generally desirous that a switch connecting a kettle to an electric power source be opened after water is boiled, i.e. after maintaining hot water at 100° C. under atmospheric pressure for a few seconds. However, it is not easy to open a switch after maintaining the temperature of hot water at 100° C. for a few seconds. In a conventional electric kettle of this type, a steam hole is provided at the back side of a pot, and a bimetallic strip is disposed against the hole, which opens a switch by detecting or sensing the temperature of the steam exhausted from the hole. In another conventional electric kettle, a timer or a time relay is provided to open a switch after elapse of a predetermined period of time, by setting the timer at a predetermined time which is needed for boiling water.

With the first type of conventional kettle, which uses a bimetallic strip, it is difficult to obtain an accurate and constant operation of a kettle because of the various operating characteristics of bimetallic strips, and the bimetallic strip will be corroded by moisture because it is constantly exposed to steam. Thus, a reliable switching operation for a long time cannot be expected with such a kettle using a bimetallic strip.

In the second type of conventional kettle, which uses a time relay, construction is complicated because of use of a time relay or a timer. Further, since a timer must be set for each operation, it is troublesome in operation and such a kettle is expensive.

Furthermore, such a kettle using a bimetallic strip or a timer is not prevented from being heated without water in it unless another switching means is provided for safety.

The main object of this invention is to provide an electric kettle comprising a main body, a lid detachable from the main body, an electric heating element provided inside the body and a thermal switch actuated upon reaching a predetermined temperature to switch off electric current through the heating element, wherein one portion of the heating element is disposed in the vicinity of the temperature sensitive part of the thermal switch, the temperature sensitive part being housed in an enclosure together with the one portion of the heating element, the enclosure being provided with an outlet or outlets for releasing the steam, produced by the one portion of the heating element, from the enclosure, the substantial part of the water being eliminated from the enclosure by the pressure of the steam, the temperature sensitive part being heated in a manner as though the kettle were substantially devoid of water, thus to subsequently actuate the thermal switch.

Another object of this invention is to provide an electric kettle of simple structure and compact construction.

Still another object of this invention is to provide a safe electric kettle which will never be heated without water being in it.

Other objects and advantages of this invention will become apparent from the following description with reference to the accompanying drawings in which:

FIG. 1 is an elevation view of an electric kettle of this invention partly in section;

FIG. 2 is a sectional view of a heating means for a kettle of this invention;

FIG. 3 is a right side view of the heating means shown in FIG. 2;

FIG. 4 is a side view of a switching mechanism partly in section;

FIG. 5 is a right side view of the switching mechanism shown in FIG. 4;

FIG. 6 is a front view of the movable switch contacts;

FIG. 8 to FIG. 10 illustrate another embodiment of the main part of this invention, wherein FIG. 8 is a side view in section, FIG. 9 is a left side view of that shown in FIG. 8, and FIG. 10 is a right side view of that shown in FIG. 8.

Figure 7:
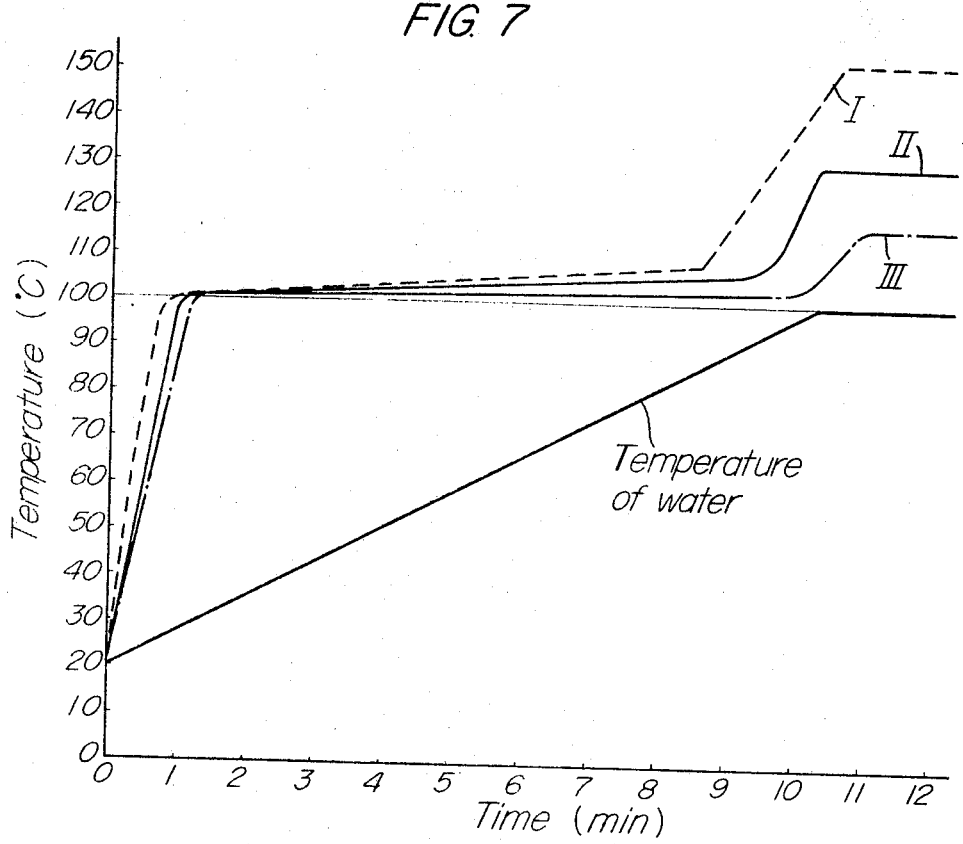
FIG. 7 is a temperature characteristic curve of the thermosensitive element of a thermostat and of water.

In the following description an embodiment of this invention is explained with reference to FIG. 1 through FIG. 6.

Referring to FIG. 1, a main body 1 of an electric kettle having a spout 2 as shown. A handle 3 is bolted with bolts 5 to two fixtures 4 secured to the main body 1 at the front portion and back portion thereof, respectively, to project upwardly. The opening at the upper part of the main body 1 is covered with a detachable lid or cover 6 having a knob 7 and a temperature indicating means 8 at the central portion thereof. An electric heating element 9 for heating water within the main body is mounted on the inside of the bottom of the main body 1.

A part of the back portion of the main body 1 is cut off, and a base plate 10 is fixed inside the body 1 to enclose the cut-off portion with a packing 11 ensuring liquid tightness of the kettle. Both ends of the electric heating element 9 extend to the outside of the body 1 through the holes at the upper part of the base 10, an intermediate portion 9a of element 9 contacting the base plate 10. The heating element 9 is soldered to the base plate 10 at the portion 9a and at the portions extending through the base plate 10.

On the rear side of the portion of the base plate 10 in contact with the intermediate portion 9a of the heating element 9, a temperature sensitive ferrite piece 12 is mounted by a holding plate 13, and a magnet 14 is supported by a holder 15 oppositely-disposed to the ferrite piece 12.

The portion of the inner side of the base plate 10, on the outer side of which portion the ferrite piece 12 is positioned, is enclosed, together with the portion 9a of the heating element 9, by a cover 19 having holes 17 and 18 on the upper part and the lower part thereof, respectively. This arrangement defines a chamber C. Metallic terminal fixtures 22 and 23 are fixed to the terminals 20 and 21 of the heating element 9, respectively, each provided with contacts 24 and 25, respectively, forming the fixed contacts of a normally closed switch provided with movable contacts 30 and 31 on spring contact plates 28 and 29 secured to terminal 27 of a power connector 26. A supporting plate 32 provided with a supporter 33 at the upper part thereof is secured to the back portion of the main body 1. A supporting vase 34, to which a porcelain insulator 35 is secured with a screw 36, is fixed to the lower portion of the supporting plate 32. The terminals 27 are secured to the porcelain insulator 35.

A lever 37 is rotatably pivoted at one end to the supporter 33, and is fixed at the other end to the holder 15. A pair of insulating fingers 38 are secured to the middle portion of the lever 37 opposite to the contactor plates 28 and 29 for operating the contactor plates 28 and 29 to open contacts 24, 30 and 25, 31 when the magnet 14 is no longer attracted to ferrite piece 12. A reset lever 39 is pivoted rotatably at its central portion 40 to the end of the supporter 33, and a rod 41 intervening between the lever 39 and the lever 37 is pivoted at its end to the lever 39 and the middle portion of the lever 37, respectively. The main body 1 is provided with a cover 44 which covers the switch means provided within the main body 1, except for the reset lever 39 which is exposed outside of the cover 44. The cover 44 is fixed to the main body 1 by screws 45 and 46. The main body 1 is provided at its bottom with legs 47.

The distance between the magnet 14 and the ferrite piece 12, when the magnet 14 is in the position shown in dotted lines in FIG. 1, is so designed that the magnet 14 is not attracted by the ferrite piece 12 against the counter force of a spring 16.

When water is poured into the main body 1 and the lever 39 is locked in the position as shown in full lines in FIG. 1, the rod 41, the lever 37 and the holder 15 are moved to the position shown in full lines in FIG. 1 and the ferrite piece 12 attracts the magnet 14 overcoming the opposing force of the spring 16. In this state, the fingers 38, which are fixed to the lever 37, disengage the contact plates 28 and 29, and allow the contacts 24 and 30, 25 and 31 to contact each other respectively so that the switches are closed. Thus, a circuit from one of the terminals 27 of the power supply through the contact plate 28, the contacts 30 and 24, the metallic terminal fixture 22, the terminal 20, the heating element 9, the terminal 21, the terminal fixture 23, the contacts 25 and 31 and the contact plate 29 to the other terminal 27 is closed, supplying power to the heating element 9, as illustrated in FIG. 1.

By supplying power to the heating element 9, water in the main body 1 is heated. The portion 9a of the heating element 9 also heats water within the chamber C.

The temperature of the heating element 9 and the base plate 10 does not exceed 100° until water in the main body 1 is boiled, because heat generated in the heating element is absorbed by water, i.e. the heating element is cooled by water. Also the base plate is cooled by water, even though heat is transmitted to the base plate from the heating element.

When water in the main body 1 is heated to the boiling point and begins to boil or to evaporate, evaporation within the chamber C increases remarkably, and steam thus evaporated flows out of the hole 17.

When temperature of water reaches 100° C. and evaporation becomes more violent, so that a part of the steam cannot flow out of said hole 17 and accordingly accumulate within the cover 19, water within the chamber C decreases owing to pressure of accumulated steam, while accumulated steam reaches near the surface of the portion 9a by depressing the water level within the chamber C, the water being displaced through hole 18. Then heat transmission rate from the heating element 9 to water, or cooling rate of the heating element 9 by water decreases, causing the temperature of the base plate 10 to rise to above 100° C. Namely, the base plate 10 is substantially heated as if the kettle was heated without containing water.

Thus, by setting the Curie point of the ferrite piece 12 at about 120° C., the temperature of the base plate or the ferrite piece 12 exceeds 120° C. only when water is boiled by detecting rapid temperature rise, causing the magnet 14 to move apart from the ferrite piece 12 by the spring 16 automatically and quickly, and resulting in cut-off of the power supply by opening the contacts 30 and 31 from the contacts 24 and 25, repectively, through parts 37 and 38.

In practice, a ferrite having a composition of 51% of $Fe_2O_3$, 27.5% of $Mn_2O_3$ and 21.5% of $ZnO$ is used.

Further explanation of the holes 17 and 18 will be made hereinafter. The hole 17 is for the purpose of limiting or controlling steam to obtain a rapid temperature rise of the thermosensitive ferrite element, and the hole 18 is for the purpose of balancing to determine the operating point of the switch means by controlling supply of water from the chamber C relative to the amount of steam emerging from the hole 17 and the quantity or amount of steam evaporated within the chamber C, and preventing excess flow of water into the chamber C by convection, so that the quantity of water flowing into the chamber C by convection does not exceed the amount desired. The position of the hole 18 is determined by the relative position of the heating element 9 within the cover 19.

The graph in FIG. 7 illustrates the relation between the temperature rise of the thermosensitive part (ferrite) and the temperature rise of water with reference to the following table under the following conditions: the amount of water poured into the body 1 is 3.408 liters, ambient temperature is 27° C., the temperature of the water is 20° C., the power supplied is 2 kw., the diameter of the lower hole 18 is fixed at 2.5 mm., and the diameter of the upper hole 17 is varied from 2 mm. to 2.3 mm. and 2.4 mm.

| Test No. | Diameter of hole 17, mm. | Water temperature (° C.) at which the sensitive part responds to open the switch | Temperature of sensitive part (° C.) at boiling temperature (95° C.) of water | Temperature rise of sensitive part from boiling temperature (95° C.) of water | Temperature at saturation, ° C. |
|---|---|---|---|---|---|
| I | 2.0 | 85 | 128 | 28 | 156 |
| II | 2.3 | 93 | 108 | 22 | 130 |
| III | 2.4 | 99 | 102 | 14 | 116 |

Accordingly, if the Curie point of the ferrite 12 is set at 120° C., for example, the switch is opened at 88° C. of water temperature in test case No. I, and at 98° C. in test case II, while the switch is kept closed in test case III. Accordingly, taking into consideration the voltage variation, and other factors, if the conditions being that the temperature to actuate the ferrite is about 100° C., and the dimensional relations are appropriately selected, boiling water of constant temperature can be obtained.

A single hole of larger diameter may be provided at the side of the cover 19 instead of the two holes 17 and 18, or holes in multiple may be provided at the upper and lower parts as well as at the side of the cover, resulting in the same effect with the above-preferred embodiment.

Figure 9:
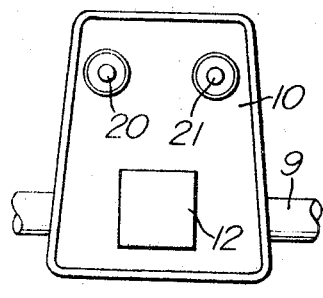
Figure 8:
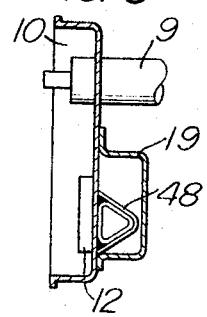
Figure 10:
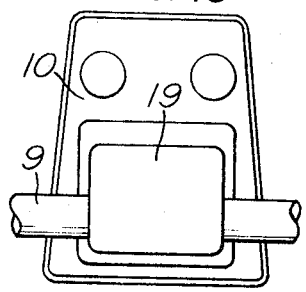

Further, as illustrated in FIG. 8 to FIG. 10, a gap 48 may be provided between the heating element 9 and an aperture in cover 19 through which element 9 penetrates instead of the above-described holes, resulting in the same effect with the above-described embodiment.

Thus, in this invention, a thermal switch is to be operated under the condition that the temperature sensitive part of the switch is placed in the state substantially as if water has not been poured into the kettle. The accuracy of work temperature can be obtained satisfactorily with thermal switches which can be produced in a mass quantity. Moreover, only by positioning the temperature sensitive part in the vicinity of a part of a heating element and enclosing the sensitive part with a cover, the switch can be operated always accurately without requiring a timer or a moisture preventing means in case a steam jet is utilized to detect boiling of the water, as in the conventional kettles, and accordingly construction of an electric kettle of this invention can be remarkably compact.

Furthermore, since a temperature sensitive part of a thermal switch operates when hot water does not contact it, namely if a kettle is heated without water poured in it, the switch duly operates and opens, even when electric power is supplied to a kettle containing only a little water or without water poured into it. Accordingly, the switch can be opened either when water has been boiled or when a kettle is supplied with electric power without water poured into it, although the switch is provided with only one thermostat. Thus, the kettle of this invention is quite convenient eliminating the necessity of using a plurality of thermal switches as in the conventional kettle.

Heretofore, a thermal switch using a magnet and a ferrite has been described; however, it is not necessary to limit a thermal switch to such a composition. A snap-acting bimetal, for example, may be used resulting in the same effect. Since some errors in manufacturing ferrites may exist, bimetal strips may not move uniformly. On the other hand they are needed to have accuracy of a certain degree when they are in use, and such bimetals cannot be mass-produced. In this invention, however, since a sensitive part of a bimetal is exposed to substantial heat without being immersed in water and in this state the temperature of the sensitive part rises rapidly, mass-produced bimetals which do not work accurately can be used.

Next, a temperature indicating means 8 provided at the central portion of the cover 6 will be explained. A transparent cap-shaped cover 50 made of plastic material contains inside thereof an indicating cylinder 51, and a small hole 52 is provided for introducing air so that the cylinder 51 can move smoothly upwardly and downwardly. At the lower part of the cylinder 51, a projecting part or a rim 53 is formed which fixes a magnet 54 in its position. A soft ferrite 55, of which the Curie point is set at about 70° C.–80° C., is placed between magnets 54 and 56. The magnet 56 is similar to the magnet 54, and the adjacent poles of the magnets 54 and 56 are of the same polarity. The magnet 56 is embraced in a recess in the ferrite 55, biasing the magnetic flux passage generated by the magnet 54.

Further, by choosing the ferrite 55 so that it does not saturate with the magnetic flux generated by the magnet 54 and passing through the ferrite 55, the magnets 54 and 56 will both attract the ferrite 55, instead of repulsing each other at a temperature under the Curie point, even though both magnets are facing with poles of the same polarity. A case 57, to the bottom part of which the magnet 56 and the ferrite 55 are fixed, and at the upper opening provided with the cover 50, is fixed to the center portion of the lid 6 penetrating the lid and being sealed with a packing 58. Accordingly, a part of the indicating cylinder 51 extends from the cover 6 upwardly, and a part of case 57 extends from the lid 6 downwardly to the inside of the body 1.

When the heater 9 is supplied with electric current and heats the water contained in the body 1, the case 57 fixed to the lid 6 is heated according to the temperature rise in the water, and the temperature of the case rises as well as that of the water in the body 1. When the temperature of the water being heated in the body 1 is raised and steam is evaporated, the ferrite 55 senses the temperature, and when the temperature exceeds the Curie point (in this case about 70° C.–80° C.), then the flux density in the ferrite 55, which biases the flux of the magnet 54, decreases to nearly zero, and then the magnets 54 and 56 repulse each other. According to this repulsion, the magnet 54 together with the indicating cylinder 51 moves upwardly within the lid 6. If the side surface of the indicating cylinder 51 is colored, such as red or blue and so on, the colored part of the indicating cylinder 51 can be viewed from outside, which position indicates the temperature of water in the body 1.

Thus, the temperature inside the body 1 can be discerned by viewing the temperature indicator from outside, protecting people from getting burnt by touching the body 1 with their hands to check the temperature of the water.

Further, this temperature indicating means does not use any metals subject to corrosion such as bimetal strips, and the operation thereof is simple, so that there is no possibility of failure, and the indicating means can indicate accurately the temperature of the water.

When the temperature of water in the body 1 decreases, then the ferrite becomes a magnetic substance again, and the magnet 54 moves downwardly to the original state. Thus, in combination with the thermal switch in this invention, desired hot water can be easily obtained.

Hereinabove, some embodiments of this invention have been described in detail; however, various modifications and changes can be made without limiting this invention to the above embodiments.

What is claimed is:

1. An electric kettle comprising a main body, a lid detachable from the main body, an electric heating element provided inside the body and a thermal switch having a temperature sensitive part mounted to be responsive to the temperature within said main body, said switch being atuated upon sensing a predetermined temperature to switch off electric current through the heating element, one portion of the heating element being disposed in the vicinity of the temperature sensitive part of the thermal switch, an enclosure housing the one portion of the heating element, at least one outlet in said enclosure for releasing only part of the steam provided by the one portion of the heating element in the enclosure, a substantial part of the water being eliminated from the enclosure by the pressure of the steam when the water boils, the temperature sensitive part thereby being rapidly heated to a temperature higher than the boiling point of the water to subsequently actuate the thermal switch.

2. An electric kettle according to claim 1, wherein the outlet for the release of steam is a hole provided in the top side of said enclosure.

3. An electric kettle according to claim 1, wherein the outlet for the release of steam is the clearance between the heating element and an aperture of the enclosure through which the heating element extends.

4. An electric kettle according to claim 1, wherein the main body includes a supporting member which is provided inside the main body so as to form water-tight seal around an opening thereof, the one portion of the heating element being in contact with the inner surface of the supporting member, and a ferrite piece forming the temperature sensitive part of the switch and being attached on the outer surface of the supporting member opposite the one portion of the heating element, said thermal switch further comprising a magnet positioned opposedly to the ferrite piece to be attracted thereto, a spring urging the magnet away from the ferrite piece, and switch contacts which open to switch off electric current of the heating element when the magnet is no longer attracted to the ferrite piece.

5. An electric kettle according to claim 1, wherein said thermal switch is of a snap acting type using a bimetallic element.

6. An electric kettle according to claim 1, wherein said kettle further comprises a temperature indicator comprising two magnet pieces disposed with their ends of the same polarity facing each other, and a ferrite piece disposed between said two magnet pieces so that the temperature is indicated by departure of said magnet pieces from each other when the temperature is higher than the Curie point of said ferrite.

7. An electric kettle according to claim 4, wherein said switch contacts comprise a movable contact mounted on a resilient strip supported by one of the power input terminals, a fixed contact mounted on one of the terminals of said housing element, said movable and fixed contacts being disposed opposedly to constitute a set of normally-closed contacts, a lever one end of which is pivoted to a part extending from said main body of the kettle, and the other end of which is connected to said magnet, and which has an insulated element to engage and push away said resilient strip supporting said movable contact for opening said set of normally-closed contacts when said magnet is no longer attracted to the ferrite piece, and means for manually resetting said set of contacts by manipulating said lever in the middle portion thereof.

References Cited

UNITED STATES PATENTS

| | | | |
|---|---|---|---|
| 1,715,109 | 5/1929 | Williams | 219—331 XR |
| 2,058,769 | 10/1936 | Brown | 219—331 XR |
| 2,235,911 | 3/1941 | Wilcox | 219—441 |
| 2,274,930 | 3/1942 | Newton | 219—441 |
| 2,339,087 | 1/1944 | Mantz. | |
| 2,437,262 | 3/1948 | Levitt | 219—328 XR |
| 2,838,649 | 6/1958 | Snyder | 219—328 XR |
| 3,026,402 | 3/1962 | Russell | 219—441 |
| 3,328,561 | 6/1967 | Sakamato | 219—495 |

OTHER REFERENCES

Stiebel; German application Ser. No. St. 10160; date of printing Oct. 25, 1956.

JOSEPH V. TRUHE, Primary Examiner

C. L. ALBRITTON, Assistant Examiner

U.S. Cl. X.R.

219—328